United States Patent [19]

Muzechuk et al.

[11] 4,175,771

[45] Nov. 27, 1979

[54] RESILIENT MOUNTING MEANS FOR MACPHERSON STRUT

[75] Inventors: Richard A. Muzechuk, Kettering, Ohio; Marvin J. Hyma, Pontiac, Mich.

[73] Assignee: General Motors Corporation, Detroit, Mich.

[21] Appl. No.: 928,508

[22] Filed: Jul. 27, 1978

[51] Int. Cl.² .............................................. B60G 15/00
[52] U.S. Cl. .................................... 280/696; 267/8 R
[58] Field of Search ............... 280/688, 690, 692, 696, 280/722, 724; 267/8, 20, 34

[56] References Cited

U.S. PATENT DOCUMENTS

| | | | |
|---|---|---|---|
| 2,980,441 | 4/1961 | Timpner | 280/693 |
| 3,155,382 | 11/1964 | Shakespear | 267/8 |

Primary Examiner—Philip Goodman
Attorney, Agent, or Firm—Charles R. White

[57] ABSTRACT

The drawings illustrate a MacPherson strut-type concentric shock absorber and coil spring. A single elastomeric ring is preloaded between upper and lower retainer members, and suitable bearing means are mounted between the bottom portion of the elastomeric ring and a spring retainer flange for the upper end of the coil spring. The piston rod is secured within the center portion of the elastomeric ring. In this arrangement, the preloaded outer portion of the elastomeric ring is subjected to compression forces during jounce and rebound conditions, and the preloaded center portion of the ring is subjected to shear forces during such jounce and rebound conditions, thereby providing predetermined different stiffness characteristics for the shock absorber and the coil spring.

3 Claims, 3 Drawing Figures

RESILIENT MOUNTING MEANS FOR MACPHERSON STRUT

This invention relates generally to independent wheel suspension systems and, more particularly, to mounting means for the upper end portion of a strut-type suspension.

Heretofore, the mounting arrangements for the upper end portions of MacPherson strut suspension systems, wherein the coil spring is mounted around the shock absorber, have generally included a spring mounting bracket or plate which is mounted on the piston rod adjacent an annular resilient bushing, as shown in Moss U.S. Pat. No. 3,490,785, or have embodied dual, concentric rubber bushings or sleeves, with an intermediate annular metal member, wherein the spring mounting plate is mounted on the metal member, as disclosed in Desbois U.S. Pat. No. 3,584,856, while the piston rod in each case is secured through the innermost surface of the resilient bushing.

While these prior arrangements have been generally satisfactory, there is a need for an improved, simplified upper mounting means which includes a single elastomeric bushing adapted to provide dual stiffness characteristics to the shock absorber and the coil spring, and which is preloaded to enhance efficiency and durability.

Accordingly, a general object of the invention is to provide an improved MacPherson strut mounting means which provides the above features.

Another object of the invention is to provide a MacPherson strut upper mounting arrangement including a single elastomeric ring, a bushing bonded to the inner surface of the elastomeric ring and adapted to having the piston rod extension secured therein, and a bearing support ring adjacent a portion of the bottom surface of the elastomeric ring concentric with the center of the elastomeric ring and adapted to having bearing means abutted thereagainst for supporting an upper spring retainer flange. The elastomeric ring is preloaded by virtue of its outer cylindrical and exposed bottom surfaces being compressed between upper and lower, interconnected, contoured retainer members. The resultant preloaded outer portion of the elastomeric ring is thus subjected to compression forces during jounce and rebound conditions of the coil spring, and the resultant preloaded center portion of the elastomeric ring is subjected to shear forces during such jounce and rebound conditions of the piston rod, thereby providing predetermined different stiffness characteristics for the shock absorber and the coil spring.

These and other objects and advantages of the invention will be apparent when reference is made to the following description and accompanying drawings, wherein.

Figure 1:
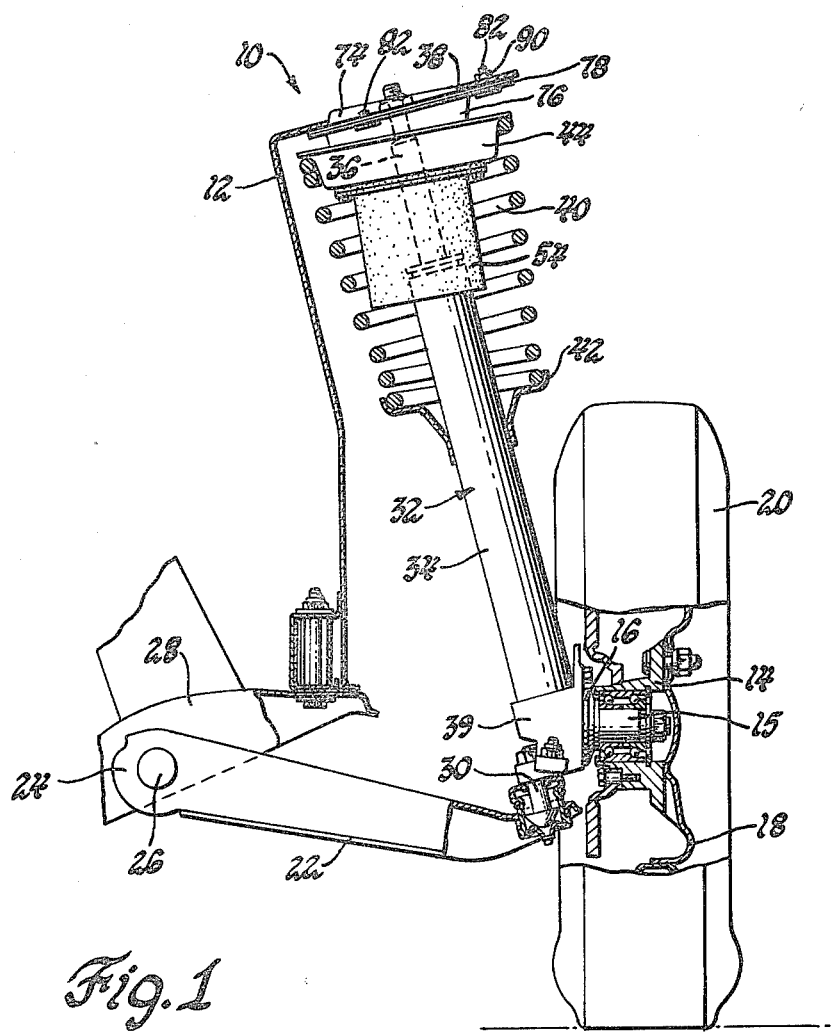
FIG. 1 is an end view in partial cross-section of a vehicular front suspension system embodying the invention.

Referring now to the drawings in greater detail, FIG. 1 illustrates a front suspension system 10 mounted between a suitable tower portion or upper wheel well of a vehicular body, represented at 12, and a wheel hub 14, the latter being rotatably mounted on a wheel spindle 15 formed on a steering knuckle 16. A conventional wheel 18 and tire 20 are mounted on the hub 14.

The suspension system 10 includes a conventional control arm 22, which may be of the wishbone type, having its inner ends 24 pivotally mounted in a bracket, represented at 26, in the frame or undercarriage 28 of the body 12 and its outer end connected by a ball joint 30 to the steering knuckle 16.

A shock absorber 32 includes an outer casing 34 encompassing a piston (not shown) carried by a piston rod 36 which extends exteriorly of the upper end of the casing and is flexibly connected to the sprung mass or body 12 adjacent an opening 38 formed in the body. The lower end of the shock absorber casing 34 is mounted in a mounting boss or bracket 39, which may be formed on or secured to the steering knuckle 16. A coil spring 40 surrounds adjacent parts of the casing 34 and the piston rod 36, and is mounted at its lower end on a retainer flange 42 secured to the outer casing 34 and at its upper end against a second retainer flange 44 which is flexibly connected to the sprung mass in a manner to be described. The lower retainer flange 42 may be either concentric or non-concentric with respect to the shock absorber casing 34, depending upon the particular model vehicle involved.

Figures 2, 3:
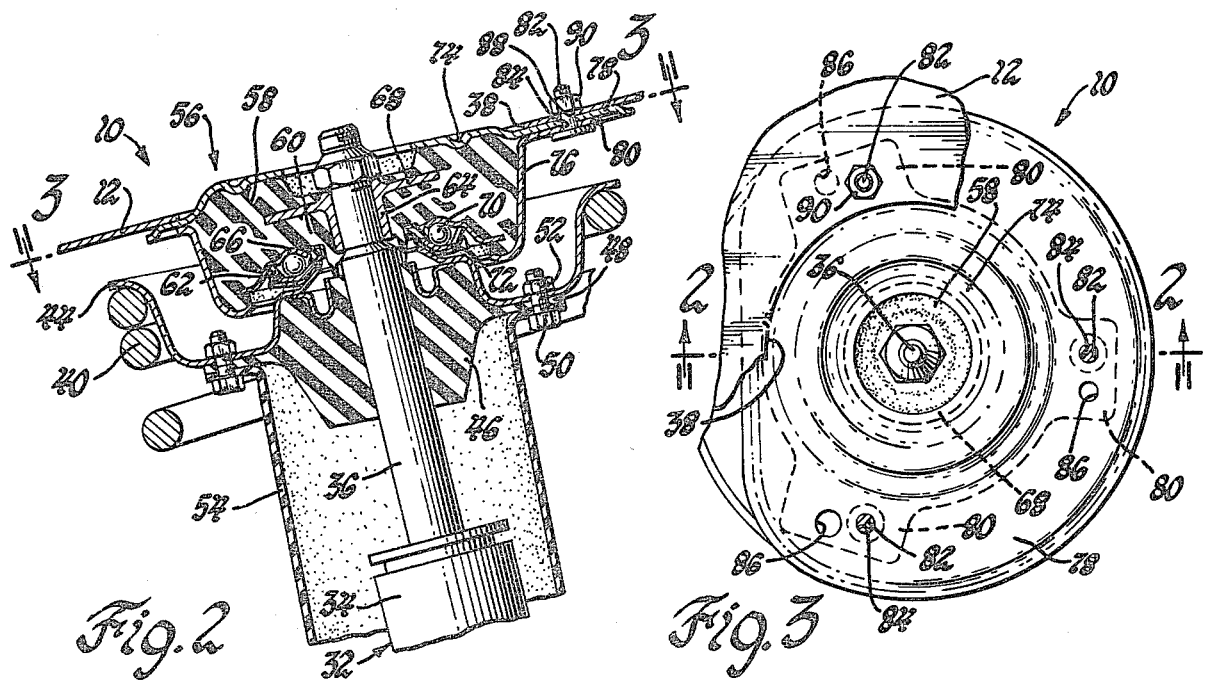
FIG. 2 is an enlarged cross-sectional view of a portion of the FIG. 1 structure, taken along the plane of the line 2—2 of FIG. 3, and looking in the direction of the arrows.
FIG. 3 is a cross-sectional view taken along the plane of the line 3—3 of FIG. 2, and looking in the direction of the arrows.

A resilient bushing 46 (FIG. 2) is shaped to match the inner portion of the underside of the upper spring retainer flange 44, including external flange means or tabs 48 secured to the retainer flange 44 by suitable fastener means, such as bolts 50 and nuts 52. The bushing 46 is mounted freely around the piston rod 36 to serve as a stop member for the cylinder 34. A cylindrical dust shield 54 surrounds the extended portion of the piston rod 36 and is also secured to the upper spring retainer flange 44 by the fastener means 50 and 52.

A dual rate elastomeric mounting arrangement 56 includes a single elastomeric ring member 58 having an integral hub-like center portion 60 of reduced thickness and a bottom surface 62 formed in a stepped configuration. A metal bushing 64 is bonded to the inner surface of the center portion 60, and a contoured bearing support race or ring plate 66 is abutted against the bottom surface 62. The metal bushing 64, which is bonded to the inner surface of the center portion 60, includes a radial flange 68 confined within the body of the elastomeric ring, and the radially outer edge portion of the bearing support race 66 is also confined within the body of the ring 58. A suitable bearing 70 and race member 72 are mounted between the bearing support plate 66 and the upper spring retainer flange 44.

The single elastomeric ring member 58 is preloaded to a predetermined extent at its upper, lower and outer surfaces between upper and lower contoured retainer members 74 and 76, respectively, and around the inner metal bushing member 64. The retainer members 74 and 76 include a flange 78 and a plurality of mounting tabs 80, respectively, secured together by suitable fastener means, such as a bolt 82 which is mounted upwardly through aligned openings 84 formed in the retainer member portions 78 and 80, and staked securely in the upper opening 84. Additional aligned openings 86 (FIG. 3) are formed adjacent the respective openings 84 merely to aid in the aligning and subassemblying of the ring and retainer members. At final assembly on the vehicle, as may be noted in FIG. 2, the bolts 82 are mounted through openings 88 formed in the tower 12 and secured thereto by nuts 90.

The steering axis for the wheel 18 passes through the centers of the elastomeric ring 58 and the ball joint 30 which projects downwardly from the steering knuckle 16. It's apparent that the mounting flange 39 may be located above or in front of or to the rear of the axis of the wheel 14 to accommodate the drive axle of a front wheel drive vehicle.

In view of the particular mounting arrangements described above relative to the respective upper ends of the coil spring 40 and the piston rod 36, it may be noted that the preloaded outer portion of the single elastomeric ring 58 is subjected to compression forces during jounce and rebound conditions, and the preloaded center portion of the elastomeric ring 58 is subjected to shear forces during such jounce and rebound conditions, thereby providing independent control of the stiffness characteristics for the shock absorber 32 and the coil spring 40. Since tension forces or stretching tend to degrade rubber, inasmuch as the ring 58 is preloaded there is little likelihood of its being subjected to tensile forces during the normal jounce and rebound conditions. In other words, under normal operative conditions, the preloaded rubber ring 58, in lieu of being stretched, would tend to be urged toward its normal free length, thus enhancing its durability.

It should be apparent that the invention provides an improved, simplified and efficient strut mounting means, wherein a single, preloaded elastomeric ring member provides dual stiffness characteristics for the shock absorber and coil spring, as well as independent control of the two stiffnesses, while maintaining maximum durability under operative conditions.

While but one embodiment of the invention has been shown and described, other modifications thereof are possible.

The embodiments of the invention in which an exclusive property or privilege is claimed are defined as follows:

1. In a vehicle suspension system including sprung and unsprung masses, a shock absorber operatively connected between the sprung and unsprung masses, the shock absorber outer casing being operatively connected at its lower end to the unsprung mass and having a piston rod extending exteriorly of its upper end and flexibly connected to the sprung mass adjacent an opening formed in the sprung mass, and a coil spring mounted around the shock absorber and being operatively connected at its lower end to a retainer flange formed on the outer casing and having its upper end flexibly connected to the sprung mass, the improvement comprising a dual-rate elastomeric mounting means adapted to being secured to the sprung mass and operatively connected to the piston rod and the upper end of the coil spring, the dual-rate elastomeric mounting means including a single elastomeric ring, mounting means adapted to preloading the elastomeric ring between the mounting means and concentric with the opening in the sprung mass, bearing means operatively connected to the bottom portion of the elastomeric ring, and a spring retainer flange mounted between the bearing means and the upper end of the coil spring for subjecting the outer portion of the elastomeric ring to compression forces during jounce and rebound conditions, and the piston rod being operatively connected to the center portion of the elastomeric ring for subjecting the center portion thereof to shear forces during such jounce and rebound conditions, thereby providing predetermined different stiffness characteristics for the shock absorber and the coil spring.

2. In a vehicle suspension system including sprung and unsprung masses, a shock absorber operatively connected between the sprung and unsprung masses, the shock absorber outer casing being operatively connected at its lower end to the unsprung mass and having a piston rod extending exteriorly of its upper end and flexibly connected to the sprung mass adjacent an opening formed in the sprung mass, a coil spring mounted around the shock absorber and being operatively connected at its lower end to a retainer flange formed on the outer casing and having its upper end flexibly connected to the sprung mass, contoured upper and lower plate members secured to the sprung mass and concentric with the opening formed in the sprung mass, a spring retainer flange for the upper end of the coil spring mounted around the piston rod and concentric with at least one of the contoured plate members, and bearing means mounted around the piston rod adjacent the spring retainer flange, the improvement comprising elastomeric mounting means adapted to be secured to the sprung mass and operatively connected to the piston rod and the upper end of the coil spring, the elastomeric mounting means including a single elastomeric ring having top and bottom surfaces and an outer cylindrical surface, a bushing bonded to the inner surface of the elastomeric ring and adapted to have a portion of the piston rod secured therein, a bearing support ring operatively secured to a portion of the bottom surface of the elastomeric ring concentric with the center of the elastomeric ring and adapted to have the bearing means abutted thereagainst, the elastomeric ring being preloaded by virtue of its outer cylindrical and its top and bottom surfaces being compressively loaded between the contoured upper and lower plate members.

3. In a vehicle suspension system including sprung and unsprung masses, a shock absorber operatively connected between the sprung and unsprung masses, the shock absorber outer casing being operatively connected at its lower end to the unsprung mass and having a piston rod extending exteriorly of its upper end and flexibly connected to the sprung mass adjacent an opening formed in the sprung mass, and a coil spring mounted around the shock absorber and being operatively connected at its lower end to a retainer flange formed on the outer casing and having its upper end flexibly connected to the sprung mass, the improvement comprising a dual-rate, preloaded elastomeric mounting means adapted to being secured to the sprung mass and operatively connected to the piston rod and the upper end of the coil spring, the dual-rate, preloaded mounting means including a single elastomeric ring, a flanged bushing bonded to the inner surface of the elastomeric ring, a bearing support ring abutted against a portion of the bottom surface of the elastomeric ring concentric with the center of the elastomeric ring, upper and lower contoured plate members adapted to confining the outer cylindrical and the exposed top and bottom surfaces of the elastomeric ring and being secured to each other so as to preload the elastomeric ring therebetween and secured to the sprung mass around the opening therein, bearing means mounted on the bearing support ring, and a spring retainer flange between the bearing and the upper end of the coil spring for subjecting the preloaded outer portion of the elastomeric ring to compression forces during jounce and rebound conditions, and the piston rod being secured within the center bushing for subjecting the preloaded center portion of the elastomeric ring to shear forces during such jounce and rebound conditions, thereby providing predetermined different stiffness characteristics for the shock absorber and the coil spring.

* * * * *